(12) United States Patent
Stählin et al.

(10) Patent No.: US 11,892,549 B2
(45) Date of Patent: Feb. 6, 2024

(54) COMMUNICATION APPARATUS FOR SUBSEQUENT INSTALLATION IN A VEHICLE OR FOR MOBILE USE, AND ASSOCIATED METHOD

(71) Applicant: Continental Teves AG & Co. oHG, Frankfurt am Main (DE)

(72) Inventors: Ulrich Stählin, Nuremberg (DE); Klaus Rink, Nuremberg (DE)

(73) Assignee: CONTINENTAL TEVES AG & CO. OHG, Frankfurt am Main (DE)

(*) Notice: Subject to any disclaimer, the term of this patent is extended or adjusted under 35 U.S.C. 154(b) by 440 days.

(21) Appl. No.: 17/267,139

(22) PCT Filed: Jul. 25, 2019

(86) PCT No.: PCT/DE2019/200088
§ 371 (c)(1),
(2) Date: Feb. 9, 2021

(87) PCT Pub. No.: WO2020/035117
PCT Pub. Date: Feb. 20, 2020

(65) Prior Publication Data
US 2021/0311207 A1 Oct. 7, 2021

(30) Foreign Application Priority Data
Aug. 15, 2018 (DE) ............ 10 2018 213 716.1

(51) Int. Cl.
*H04W 4/40* (2018.01)
*G01S 19/47* (2010.01)
(Continued)

(52) U.S. Cl.
CPC ............ *G01S 19/47* (2013.01); *G01S 19/243* (2013.01); *H04M 1/72463* (2021.01); *H04W 4/40* (2018.02)

(58) Field of Classification Search
CPC ......... H04W 4/40; H04W 4/02; H04M 1/125; H04L 29/08
See application file for complete search history.

(56) References Cited

U.S. PATENT DOCUMENTS 8,438,373 B2 * 5/2013 Rubin ............... H04M 1/72448
713/1
8,971,927 B2 3/2015 Zhou et al.
(Continued)

FOREIGN PATENT DOCUMENTS

CN 102177750 A 9/2011
CN 102883037 A 1/2013
(Continued)

OTHER PUBLICATIONS

German Search Report for German Application No. 10 2018 213 716.1, dated Jun. 27. 2019, with partial English translation, 8 pages.
(Continued)

*Primary Examiner* — Tan Q Nguyen
(74) *Attorney, Agent, or Firm* — RatnerPrestia

(57) ABSTRACT

A communication apparatus for subsequent installation in a vehicle and/or for mobile use, having: a transceiver having an antenna for wireless data transmission, a GNSS receiver having an antenna for receiving signals from a global satellite navigation system, an inertial measurement unit, and a housing enclosing the transceiver, the GNSS receiver and the inertial measurement unit at least in part. The communication apparatus is configured to use data captured by the inertial measurement unit and/or the GNSS receiver to perform motion detection, in order to ascertain a motion pattern, and to perform or prevent a data transmission by the antenna for the purpose of wireless data transmission as a
(Continued)

function of the ascertained motion pattern. Furthermore, the a method for execution using such a communication apparatus is disclosed.

15 Claims, 2 Drawing Sheets

(51) Int. Cl.
*G01S 19/24* (2010.01)
*H04M 1/72463* (2021.01)
*H04L 29/08* (2006.01)

(56) References Cited

U.S. PATENT DOCUMENTS

| | | | |
|---|---|---|---|
| 9,106,309 B2 | 8/2015 | Ozaki | |
| 9,854,086 B1* | 12/2017 | McSchooler | H04W 4/48 |
| 2013/0172018 A1* | 7/2013 | Correale | H04W 4/027 |
| | | | 455/456.4 |
| 2016/0014262 A1 | 1/2016 | Hodges et al. | |
| 2017/0195863 A1 | 7/2017 | Demele et al. | |
| 2018/0063324 A1* | 3/2018 | Van Meter, II | H04W 4/027 |
| 2020/0067759 A1* | 2/2020 | Xuan | H04L 41/046 |

FOREIGN PATENT DOCUMENTS

| | | |
|---|---|---|
| CN | 103810858 A | 5/2014 |
| CN | 107040654 A | 8/2017 |
| DE | 602004011587 T2 | 1/2009 |
| DE | 102014218846 A1 | 3/2016 |
| EP | 1522981 B1 | 4/2005 |
| WO | 2018118352 A1 | 6/2018 |

OTHER PUBLICATIONS

International Search Report and Written Opinion for International Application No. PCT/DE2019/200088, dated Dec. 2, 2019, with partial English translation, 13 pages.
International Search Report and Written Opinion for International Application No. PCT/DE2019/200088, dated Dec. 2, 2019, 17 pages (German).
Chinese Office Action for Chinese Application No. 201980054071.0, dated Dec. 29, 2021 with translation, 14 pages.
Chinese Office Action with Search Report for Chinese Application No. 201980054071.0, dated Jun. 24, 2021, with translation, 17 pages.

* cited by examiner

COMMUNICATION APPARATUS FOR SUBSEQUENT INSTALLATION IN A VEHICLE OR FOR MOBILE USE, AND ASSOCIATED METHOD

CROSS REFERENCE TO RELATED APPLICATIONS

This application is the U.S. National Phase Applications of PCT International Application No. PCT/DE2019/200088, filed Jul. 25, 2019, which claims priority to German Patent Application No. 10 2018 213 716.1, filed Aug. 15, 2018, the contents of such applications being incorporated by reference herein.

FIELD OF THE INVENTION

The present invention relates to a communication apparatus for subsequent installation in a vehicle or for mobile use according to the preamble of claim 1, and a corresponding method.

BACKGROUND OF THE INVENTION

Vehicle-to-X communication (V2X) based on IEEE 802.11p is currently in the process of being launched onto the market. Vehicle-to-X communication based on dedicated short-range communication (DSRC or ITS-G5) operates, for example, in a frequency band around 5.9 GHz. Vehicle-to-X communication as a cooperative technology becomes more efficient as the relative number of road users utilizing it increases. Usually, legally binding introductions merely relate to new cars, which is why existing vehicles are not affected. To this end, the parts market (frequently referred to as the aftermarket) offers devices for retrofitting these vehicles with the relevant technology. Said devices can, on the one hand, be configured as devices which can be subsequently installed in the vehicle with a comparatively high outlay or, fundamentally, as basic mobile devices. The disadvantage of this is that, in many cases, in order to obtain functionality which is comparable to the devices already installed during manufacture, due to the amount of information available, they have to be connected to at least one means of communication of the vehicle, e.g. a data bus. Furthermore, there is a potential security risk in the event of devices of this kind being abused, if these can be utilized, by way of example, in order to simulate fake position signals from road users which do not actually exist or, in the event that they are connected to a vehicle bus, in order to compromise vehicle data.

SUMMARY OF THE INVENTION

An aspect of the invention is a communication apparatus which is mobile or which can be subsequently installed and to provide a method for execution therewith, by means of which the security with respect to abuse can be increased.

In accordance with an embodiment, the invention relates to a communication apparatus in particular for subsequent installation in a vehicle and/or for mobile use, for example in or in connection with a vehicle, having:
- a transceiver having an antenna for wireless data transmission, in particular for vehicle-to-X communication,
- a GNSS receiver (GNSS) having an antenna for receiving signals from a global satellite navigation system,
- an inertial measurement unit (IMU), and
- a housing enclosing the transceiver, the GNSS receiver (GNSS) and the inertial measurement unit (IMU) at least in part. The communication apparatus is configured, according to a further development, to use data from at least the inertial measurement unit and/or the GNSS receiver to perform motion detection, in order to ascertain a motion pattern, and to perform and/or prevent a data transmission by means of the antenna for the purpose of wireless data transmission as a function of the ascertained motion pattern, at least in part. The communication apparatus is accordingly in particular designed to execute a wireless data communication or prevent a wireless data communication as a function of the ascertained motion pattern.

An aspect of the invention is based on the idea of equipping mobile communication apparatuses or communication apparatuses which can subsequently be installed, such as those which are by way of example offered in the automobile aftermarket sector, with motion detection. The data to be transmitted by means of the antenna for the purpose of wireless data transmission are, in particular, messages for vehicle-to-X communication. It is assumed that such a communication device has to independently fulfil the requirements or standards regarding vehicle-to-X communication, but does not necessarily have a communication link to a data transmission means, such as for example a CAN bus, of a relevant vehicle. The described apparatus is able to improve safety with respect to the abuse of apparatuses of this kind thanks to the fact that the communication apparatus can be deployed with a great deal of flexibility due to the motion pattern-dependent data transmission and that it is not necessary to connect it to a data transmission means of the vehicle. According to a further development, motion detection which can be supported by data received by means of the antenna for the purpose of wireless data transmission can be provided.

A vehicle within the meaning of an aspect of the invention is in particular a land vehicle, watercraft and/or aircraft, for example a car, motorcycle, ship, boat or airplane.

In accordance with an embodiment, the communication apparatus is configured, following switching on, to initially not perform and/or permit any data transmission, in particular no outputting of data. According to a further development, the apparatus is configured, for this purpose, to initially deactivate or to leave deactivated at least one transmission path for outputting data by means of the antenna.

In accordance with a further development, the apparatus is configured, based on the ascertained motion pattern, to execute an allocation to at least one of multiple motion classes in order to describe a type of progressive motion.

It should be understood that the motion classes describe a type of progressive motion which is ascertained on the basis of the motion pattern such as e.g. whether and/or, if applicable, which means of progressive motion exists. A positioning can be performed by means of the IMU even if there is no GNSS reception, for example by dead reckoning. Due to a comparatively high scanning rate, the IMU is in particular advantageous for the motion detection, since this also makes possible a comparatively short recognition time.

In accordance with a further development, the communication apparatus is configured, on the basis of the ascertained motion pattern, to perform an allocation to at least one of the following classes:
- passenger car,
- truck,
- motorcycle, bicycle,
pedestrian,
other motion.

It should be understood that the indicated terms of the classes do not define the specific designation of these, but rather classified types of motion.

According to a further development, the communication apparatus is configured, in the event that a type of motion is not recognized and/or specified and, consequently, is not successfully allocated to a motion class, to perform an allocation to the class defining other motion.

In accordance with an embodiment, the apparatus is configured to merely perform and/or permit outputting of data following a concluded classification process including categorization in at least one class. According to a further development, the apparatus is configured to activate the transmission path for outputting data by means of the antenna, for this purpose. Furthermore, the authorization can be provided for in graduations.

In accordance with an embodiment, an authorization rating for outputting data is allocated to each class. The authorization can in particular define the general permission or the general prohibition for outputting data. In the case of an allocation to a class which does not have an authorization or has a restricted authorization for outputting data, the apparatus is configured, according to a further development, to not permit and/or perform or to merely permit and/or perform the outputting of specific data.

In accordance with a further development, the communication apparatus is configured, as a function of the authorization rating, to provide for the outputting of data of merely one or more specific types. A possibility for subsequently amending the authorization ratings can expediently be provided. According to a further development, vehicle-to-X messages of a different specification are provided as predetermined types. Consequently, depending on the authorization rating, merely the outputting of a limited selection of vehicle-to-X messages of a different specification is allowed, e.g. MAP messages.

In accordance with an embodiment, at least one of the motion classes:
bicycle,
pedestrian, and/or
other motion
does not have an authorization for outputting data or merely has an authorization for outputting data in the event of at least one predefined condition being fulfilled. Such a predefined condition can result from the recognition of a local proximity to a hazardous location such as, for example, a road. In this case, it is however expedient to guarantee that the requirements of the quality of the sent data are fulfilled.

In accordance with an embodiment, a check of the quality of data to be sent takes place, wherein it is in particular checked whether the quality fulfils the predefined requirements, for example for fulfilling a standard, wherein an outputting of the data is merely to be performed and/or permitted in the event of predefined requirements of the quality being fulfilled. This check takes place, according to a further development, after permission to send the data is provided as a result of the authorization rating. This approach means that the quality of merely the data which may or should actually be sent is verified, allowing resources to be saved. Only if this is the case will data really be sent.

In accordance with an embodiment, the communication apparatus is configured to continue ascertaining the motion pattern following allocation to a movement class. Consequently, alterations to the type of motion can be established, in which case provision is expediently made for reallocation to a class. The procedures already described for further checking, for example whether sending of data is allowed, are to be applied in accordance with the class which now exists. Basically, the ascertainment of the motion pattern can therefore be continued as a consistency check of the ascertained motion class regarding the actual motion, wherein outputting of data is merely allowed in the absence of any contradictions.

In accordance with an embodiment, the communication apparatus is configured to enlist at least one of the following means or methods in order to ascertain the motion pattern:
model-based methods based on parameter estimating methods
statistical methods
clustering methods, e.g. support vector machines, and/or neural network.

Furthermore, an aspect of the invention relates to a method for execution in or using at least one embodiment of the indicated communication apparatus. Corresponding embodiments of the method are set out by the aforementioned configurations of the communication apparatus.

In a further development of the indicated communication apparatus, the indicated apparatus has a memory and a processor. The indicated method is stored in the form of a computer program in the memory and the processor is provided for executing the method, if the computer program is loaded from the memory into the processor.

According to a further aspect of the invention, a computer program comprises program code means, in order to carry out all of the steps of one of the indicated methods if the computer program is run on a computer or one of the indicated apparatuses.

According to a further aspect of the invention, a computer program product contains program code which is saved on a computer-readable data medium and which, if it is run on a data processing device, carries out one of the indicated methods.

For example, the indicated method can be realized on a so-called smartphone, since smartphones frequently exhibit all of the components provided for the execution. However, the automobile industry's requirements for security against manipulation should be expediently guaranteed. If the smartphone already comprises software for recognizing whether said smartphone is in a vehicle, authorization results of said software can possibly be enlisted for the allocation to a class.

BRIEF DESCRIPTION OF THE DRAWINGS

Some particularly advantageous configurations of an aspect of the invention are indicated in the subclaims. Further preferred embodiments are also set out by the following description of exemplary embodiments with reference to schematically represented figures, wherein:

DETAILED DESCRIPTION OF THE PREFERRED EMBODIMENTS

Figure 1:
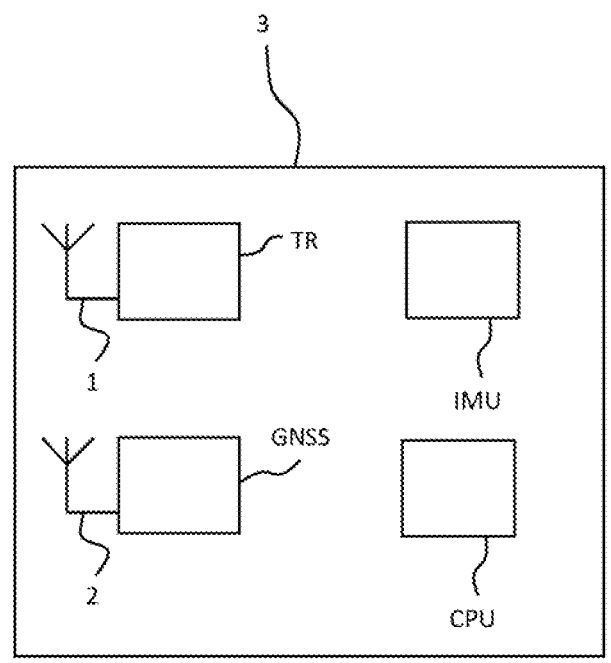
FIG. 1 shows an embodiment of the communication apparatus according to the invention.

FIG. 1 shows a communication apparatus 1 which is provided for subsequent installation in a vehicle and/or for mobile use. The apparatus comprises a transceiver TR having an antenna 1 for vehicle-to-X communication, a GNSS receiver GNSS having an antenna 2 for receiving signals from a global satellite navigation system and an inertial measurement unit IMU. The transceiver TR, the GNSS receiver GNSS and the inertial measurement unit IMU are at least mechanically protected by a housing 3 enclosing these. Furthermore, the communication apparatus has a processor CPU and a data memory (not depicted) which are likewise enclosed by the housing.

Figure 2:
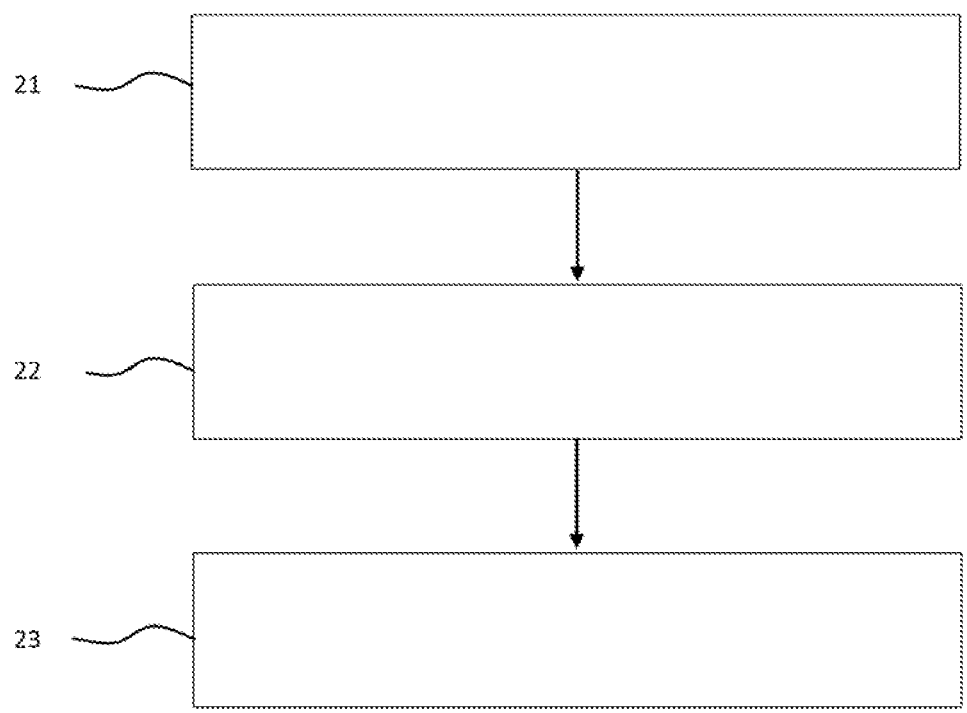
FIG. 2 shows an embodiment of the method according to the invention.

FIG. 2 shows steps of a method for execution using a communication apparatus according to FIG. 1. For example, motion detection for ascertaining a motion pattern takes place in step 21 using data captured by means of the inertial measurement unit or the GNSS receiver. In step 22, it is established on the basis of the ascertained motion pattern whether a data transmission by means of the antenna for the purpose of wireless data transmission is to be performed or to be prevented. Subsequently, as a function of the result of the step 22, the execution or prevention of the data transmission takes place in step 23 by means of the antenna for the purpose of wireless data transmission as a function of the ascertained motion pattern.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which is therefore to be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, for example, a mobile network.

The invention claimed is:

1. A communication apparatus for subsequent installation in a vehicle and/or for mobile use, comprising:
a transceiver having an antenna for wireless data transmission,
a GNSS receiver having an antenna for receiving signals from a global satellite navigation system,
an inertial measurement unit, and
a housing enclosing the transceiver, the GNSS receiver and the inertial measurement unit at least in part, wherein the communication apparatus is configured to:
use data captured by the inertial measurement unit and/or the GNSS receiver to perform motion detection, in order to ascertain a motion pattern, and to perform and/or prevent a data transmission by the antenna for the purpose of wireless data transmission as a function of the ascertained motion pattern, at least in part; and
following switching on of the apparatus, to initially not perform and/or not permit any data transmission.

2. The communication apparatus according to claim 1, configured, based on the ascertained motion pattern, to execute an allocation to at least one of multiple motion classes in order to describe a type of progressive motion.

3. The communication apparatus according to claim 1, configured, on the basis of the ascertained motion pattern, to perform the allocation to at least one of the following motion classes:
passenger car,
motorcycle,
bicycle,
pedestrian, and/or
other motion.

4. The communication apparatus according to claim 2, configured to not perform and/or permit an outputting of vehicle-to-X data prior to the conclusion of the allocation of the motion pattern to at least one motion class.

5. The communication apparatus according to claim 2, wherein an authorization rating for outputting data is allocated to each motion class.

6. The communication apparatus according to claim 5, configured, in the case of an allocation to a motion class which does not have an authorization or has a restricted authorization for outputting data, not to permit and/or perform and/or to merely permit and/or perform the outputting of specific data.

7. The communication apparatus according to claim 5, configured, as a function of the authorization rating, to provide for the outputting of data merely of one or more predetermined types.

8. The communication apparatus according to claim 7, wherein vehicle-to-X messages of a different specification are provided as predetermined types.

9. The communication apparatus according to claim 8, wherein at least one of the motion classes:
bicycle,
pedestrian, and/or
other motion
has no authorization for outputting data or merely has an authorization for outputting data in the event of at least one predefined condition being fulfilled.

10. The communication apparatus according to claim 1, configured to perform a check of a quality of data to be sent and to perform and/or permit an outputting of the data merely in the event of predefined requirements of the quality being fulfilled.

11. The communication apparatus according to claim 1, configured to continue ascertaining the motion pattern following allocation to a movement class.

12. The communication apparatus according to claim 1, configured to enlist at least one of the following means or methods in order to ascertain the motion pattern:
model-based method based on parameter estimating methods,
statistical methods,
cluster analysis methods, and/or
neural network.

13. A method for execution using a communication apparatus according to claim 1, the method comprising:
carrying out a motion detection, in order to ascertain a motion pattern, establishing, on the basis of the ascertained motion pattern, whether a data transmission by the antenna for the purpose of wireless data transmission is to be performed and/or prevented, and
executing or preventing a data transmission by the antenna for the purpose of wireless data transmission as a function of the ascertained motion pattern.

14. The communication apparatus according to claim 1, wherein the wireless data transmission is vehicle-to-X communication.

15. The communication apparatus according to claim 1, configured, following switching on of the apparatus, to initially not perform and/or permit any outputting of data.

* * * * *